No. 622,692. Patented Apr. 11, 1899.
C. H. F. HÜSER.
TIRE FOR CAR WHEELS.
(Application filed Dec. 3, 1898.)
(No Model.)
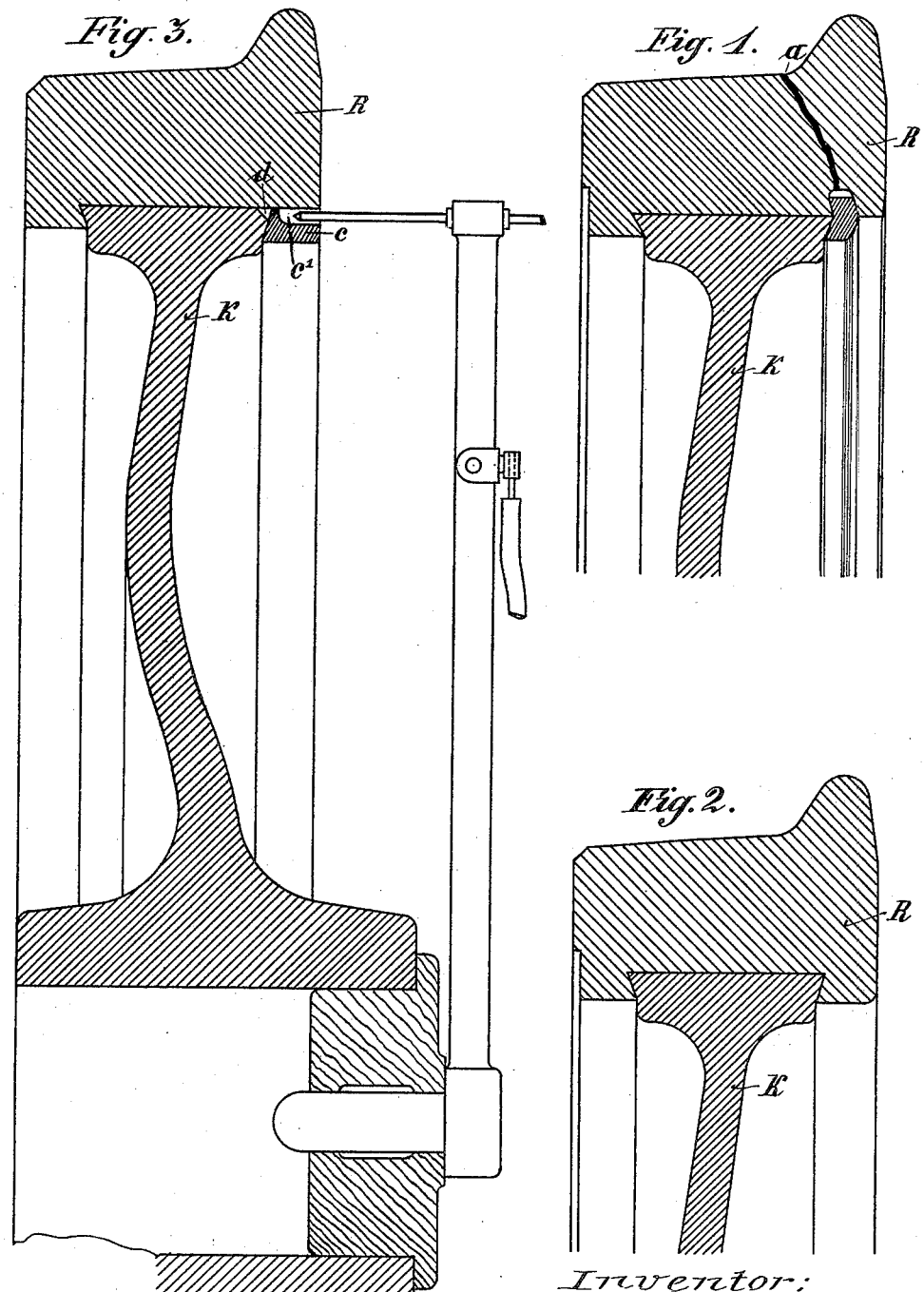

UNITED STATES PATENT OFFICE.

CASPAR HEINRICH FRIEDRICH HÜSER, OF BRUCKHAUSEN, GERMANY.

TIRE FOR CAR-WHEELS.

SPECIFICATION forming part of Letters Patent No. 622,692, dated April 11, 1899.

Application filed December 3, 1898. Serial No. 698,180. (No model.)

*To all whom it may concern:*

Be it known that I, CASPAR HEINRICH FRIEDRICH HÜSER, a subject of the King of Prussia, Emperor of Germany, residing at Bruckhausen, near Ruhrort, in the Kingdom of Prussia, Germany, have invented certain new and useful Improvements in Tires for Car-Wheels, (for which I have applied for a patent in Germany, No. 100,547, filed May 10, 1898; in England, No. 22,881, filed October 31, 1898, and in France, filed November 2, 1898,) of which the following is a specification.

The usual methods of fastening the tires to wheel-bodies have the disadvantage that the means for fastening weaken the wheel-tire, and thus produce or tend to produce breakages. Even the fastening by means of retaining-rings does not obviate this drawback, as illustrated in Figure 1 of the accompanying drawings, the ordinary place of breakage being indicated at $a$.

Fig. 2 shows a portion of a finished wheel with the tire R fastened in accordance with this invention, and Fig. 3 shows the tire in process of fastening. The wheel-tire R, Fig. 3, is turned smooth inside and is fitted with a ring $c$, which is also a close fit on the wheel-rim K. This ring $c$ is welded to the wheel-tire by electrical means in the usual manner at the groove $c'$, and there is thus produced without any weakening a fastening which allows of a much more considerable amount of wear.

At $d$ there may be inserted an incombustible cord, such as asbestos, which serves to prevent the metal from flowing into the joint between the wheel-tire R and the wheel-rim K.

I claim—

In a car-wheel the combination with the wheel-rim K of the tire fitting said rim snugly and having an annular flange overlapping one side thereof, a retaining-ring overlapping the other side and welded to the tire, and a packing of asbestos lying between said retaining-ring and the joint between the rim and tire, substantially as described.

In witness whereof I have hereunto signed my name in the presence of two subscribing witnesses.

CASPAR HEINRICH FRIEDRICH HÜSER.

Witnesses.
    EDUARD PEITZ,
    ADELBERT MÜLLER.